No. 655,501. Patented Aug. 7, 1900.
L. H. M. MERCERON-VICAT.
ARTIFICIAL CEMENT.
(Application filed Dec. 28, 1897.)
(No Model.) 3 Sheets—Sheet 1.
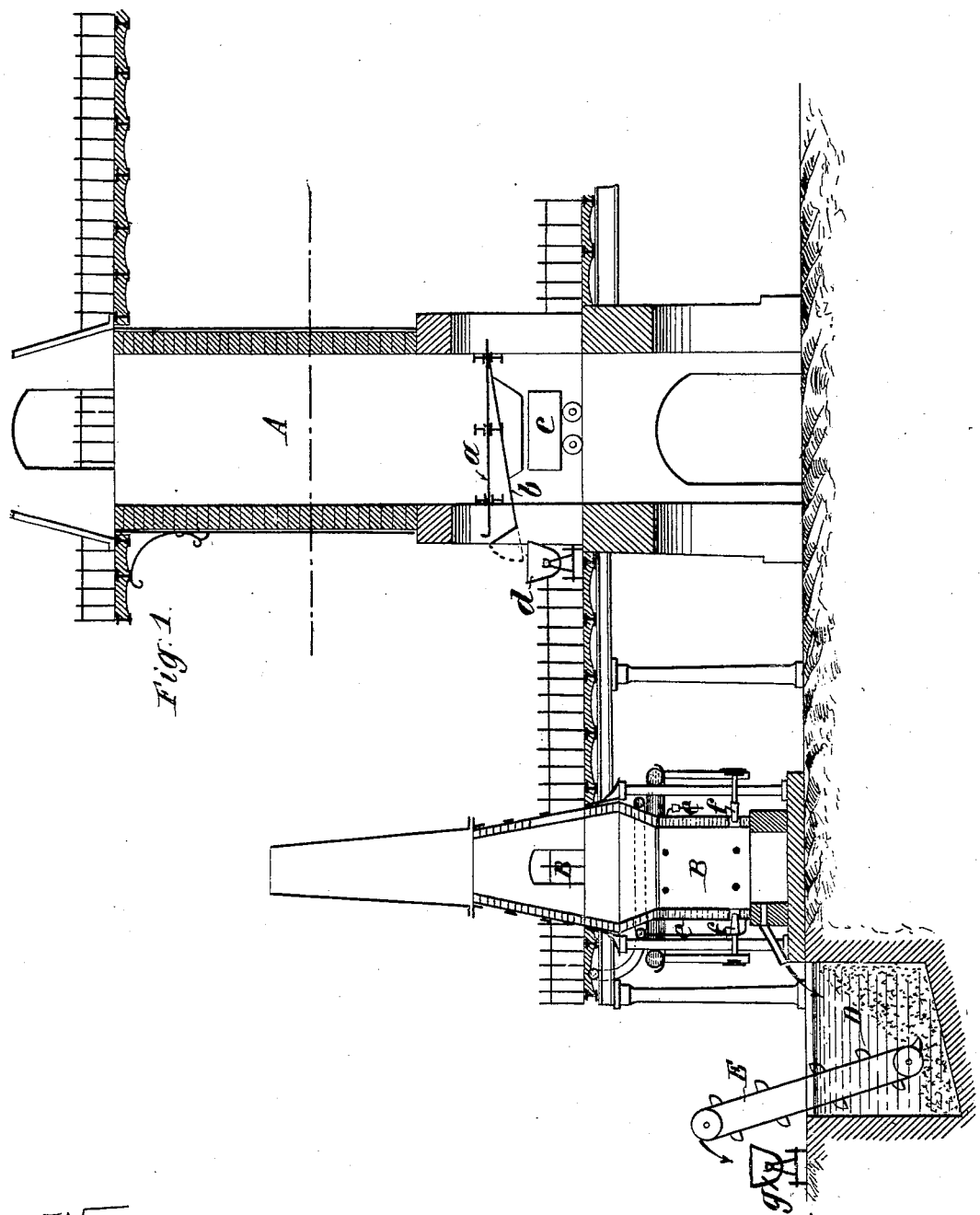
Witnesses:
F. W. Wright.
S. C. Conner
Inventor
L.H.M. Merceron-Vicat
By his Attorneys
Howson and Howson

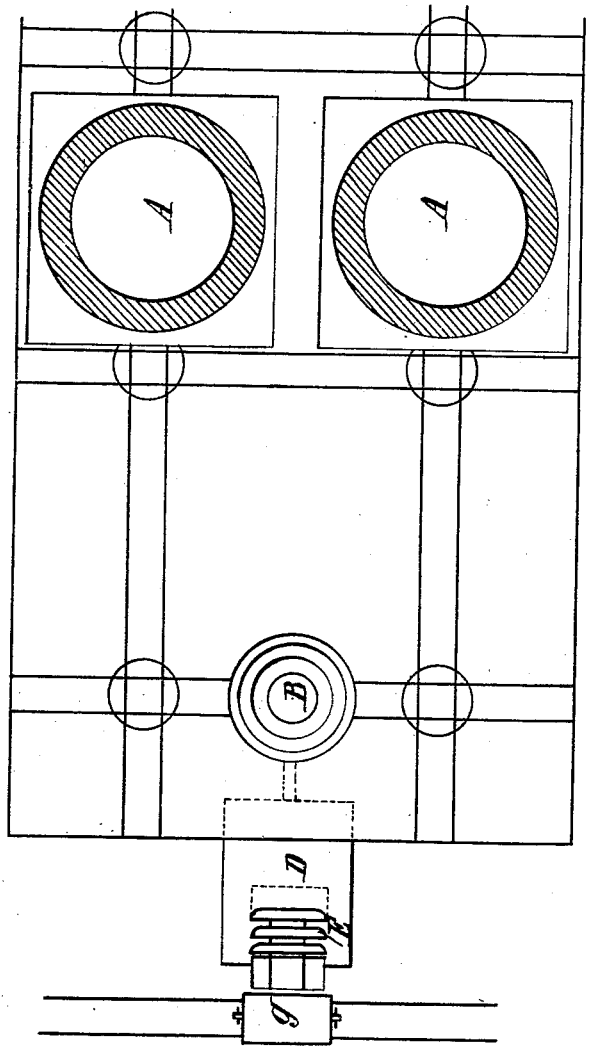

No. 655,501. Patented Aug. 7, 1900.
L. H. M. MERCERON-VICAT.
ARTIFICIAL CEMENT.
(Application filed Dec. 28, 1897.)
(No Model.) 3 Sheets—Sheet 3.
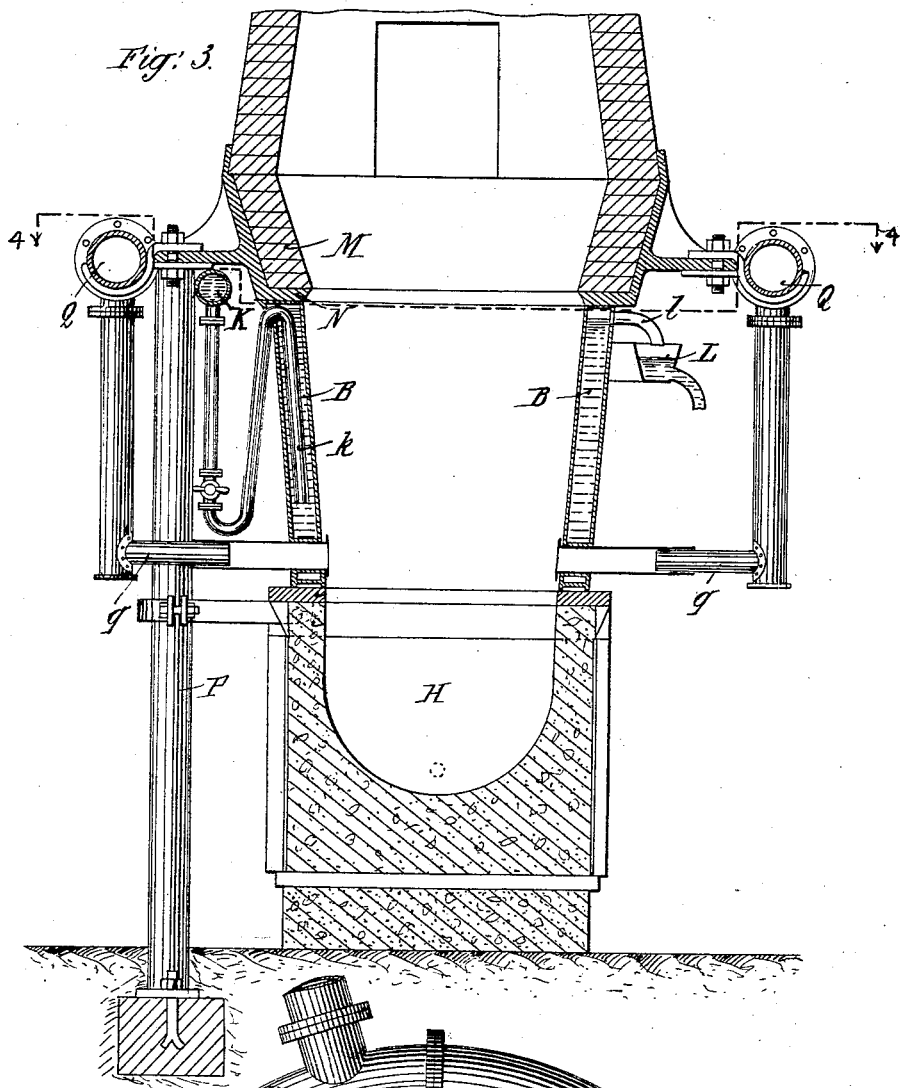
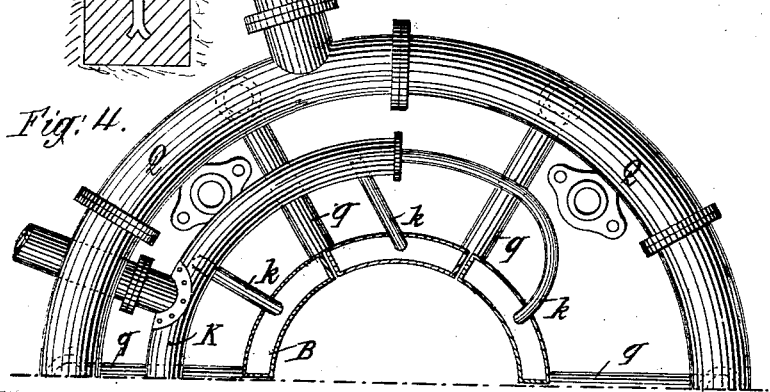
WITNESSES:
R. S. Wright
J. C. Connor
INVENTOR
L. H. M. MERCERON-VICAT
BY Howson and Howson
HIS ATTORNEYS.

UNITED STATES PATENT OFFICE.

LOUIS HENRI MAURICE MERCERON-VICAT, OF GRENOBLE, FRANCE, ASSIGNOR TO HIMSELF AND NESTOR JOSEPH EMILE CORNIER, OF SAME PLACE, AND MARIUS JOSEPH LOUIS VALLA, OF MARSEILLES, FRANCE.

ARTIFICIAL CEMENT.

SPECIFICATION forming part of Letters Patent No. 655,501, dated August 7, 1900.

Application filed December 28, 1897. Serial No. 663,973. (No specimens.)

*To all whom it may concern:*

Be it known that I, LOUIS HENRI MAURICE MERCERON-VICAT, a citizen of the Republic of France, and residing in Grenoble, France, have invented certain new and useful Improvements in and Relating to the Manufacture of Artificial Cement, (for which French Patent No. 263,590, dated January 30, 1897, and Belgian Patent No. 128,660, dated June 3, 1897, have been granted,) of which the following is a specification.

This invention has for its object an improved process for the direct and commercial manufacture of an artificial cement of great durability and freedom from impurities, such as compounds of sulfur.

The process consists, essentially, of the calcining and fusion of a natural marly limestone or of a prepared mixture of calcareous matter and of argil or clay. The product obtained is granulated after the manner of certain slags or lavas, and it serves when mixed with slaked lime and by known processes in the manufacture of hard-setting cement.

The operation comprises two consecutive stages—the decarbonization of the calcareous element and afterward the fusion—and they should be carried out, preferably, in two separate and consecutive furnaces, the first for the decarbonization and the second for the fusion.

The decarbonizating-furnace may be an ordinary limekiln of five or six meters in height only, which height is sufficient, because I extract or draw the material still heated out of the furnace to send or transmit it directly into the water-jacket.

The fusion-furnace may be a low water-jacketed apparatus of about one meter diameter and one and a half meters high, similar to those employed in the fusion of matt-copper. Fuel of low-heating power can be employed in the first furnace, the decarbonization requiring only a temperature of 800° to 900° centigrade, and the ashes can be separated in a divided or powdered condition at the bottom of the furnace.

In carrying out the process two calcining-furnaces of three meters diameter and from five to six meters in height, having good drafts, will be able to supply a water-jacketed fusion-furnace of one meter diameter which can fuse from forty to fifty tons per day.

One of the characteristic features of the invention is that it solves the important question of desulfurization. It is well-known that the presence of sulfur is harmful in cements, whether in the state of calcium sulfid or sulfate of lime, as in lava and Portland cements, and is especially harmful in hydraulic mortors or those intended to be used in the sea.

The carrying out of the operation in one and the same tall furnace would have a reducing effect like a blast-furnace, so that the fused product will contain sulfid of calcium if, as always happens, the ingredients—limestone and clay—contain sulfur. A low water-jacketed furnace, being required only to fuse, proceeds under oxidizing conditions, so that the desulfurization is almost complete. Marly limestones containing up to four per cent. or five per cent. of sulfur in the form of iron pyrites or sulfate of lime give in the water-jacket a fused product, which contains only traces of the sulfur.

In the accompanying drawings, Figure 1 is an elevation of the whole of this plant. Fig. 2 is a plan thereof. Fig. 3 is a vertical section, drawn to a larger scale, of a water-jacketed melting-furnace; and Fig. 4 is a sectional plan view on the line 4 4, Fig. 3.

Two or three furnaces A, of about three meters diameter and from five to six meters high, are fed or charged directly with the marly limestone or the mixture of calcareous matters and clay, as well as with fuel, in alternate layers. These furnaces have two grids or gratings, one having movable bars *a* for withdrawal and removal, the other and lower one having fixed bars *b* for the sifting of the cinders, which are thus separated. The calcined material is received still warm in trucks *d*, to be conveyed directly to the water-jacket B. The more or less impure fuel cinders fall into a truck *c* under the fixed grating to be thrown away.

The water-jacket is represented on a larger scale in Figs. 3 and 4. H is the crucible of refractory material, and B is the water-jacket with double walls of metal built up of several sections placed side by side in the form of a truncated cone. The water enters the bottom of each section through S-shaped tubes $k$, extending from a common circular water-pipe K. The water flows from the top of each section through a pipe $l$, discharging into a gutter L.

The casing is supported below the masonry M of the furnace under the cast-metal ring N, which is itself supported by columns P. The blast is supplied to the furnace from a circular pipe Q through branches $q$, leading to the twyers which pass through the lower part of the casing B and supply the air to the interior of the jacket.

The fused product falls directly into a tank D, where it is granulated. An elevator with perforated buckets or any other suitable elevator E raises it and discharges it into a truck $g$ to be conveyed to the drying-rooms or warehouses.

It should be understood that I do not confine myself to the precise shapes and sizes of the apparatus shown in the drawings, for I could perform the two operations—the decarbonization and the fusion—in a single water-jacket apparatus of a low height; but it is evident that the production or output would be thereby considerably lessened and the process would be much less economical.

In any case, whether the process be carried out in one or several furnaces, it is essential that the fusion should take place in a water-jacket—that is to say, in a furnace the wall of which cooled by a current of water resists the action of the fused matters—and it is also essential in order that the desulfurization may take place that this water-jacket furnace should be of such a low height that it can work under oxidizing conditions.

I claim as my invention—

In the art of making cement, the herein-described process consisting in calcining marly limestone and then fusing the same under oxidizing conditions, and thereby removing the sulfur while the materials are in a state of fusion, substantially as described.

In testimony whereof I have signed my name to this specification in the presence of two subscribing witnesses.

LOUIS HENRI MAURICE MERCERON-VICAT.

Witnesses:
AUGUSTE BURTIN,
ALEXANDER GAGMIN.